March 15, 1938. J. J. ROHRBACH 2,111,333
LOCK MEANS FOR COUPLING ELEMENTS IN OPHTHALMIC MOUNTINGS OR THE LIKE
Filed Nov. 1, 1934
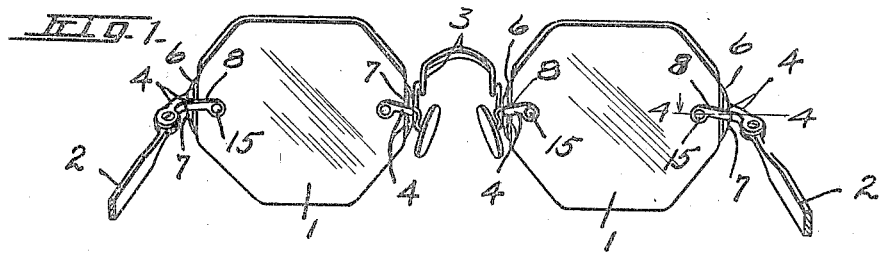
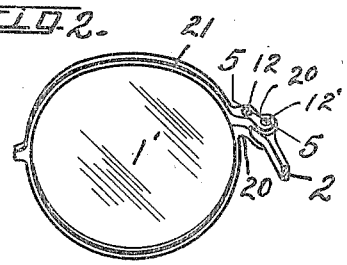
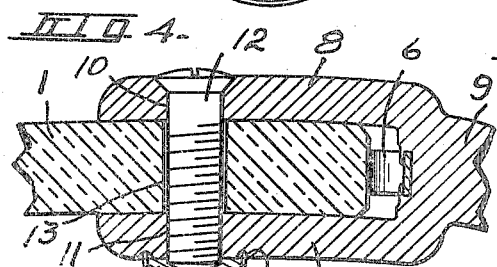
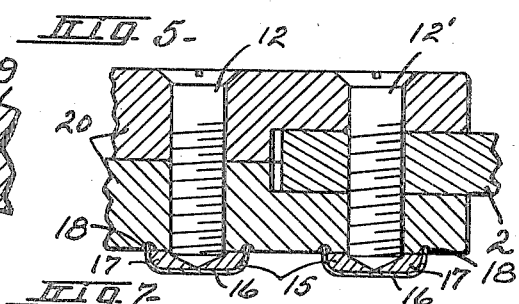
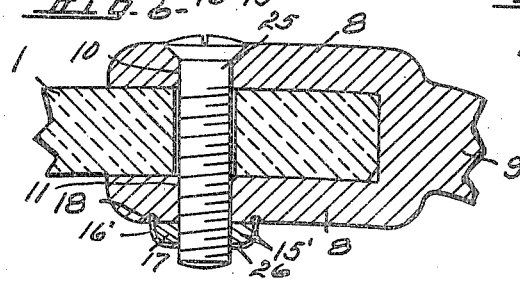
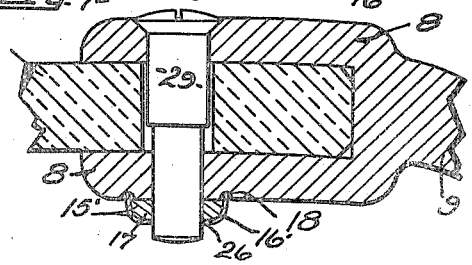
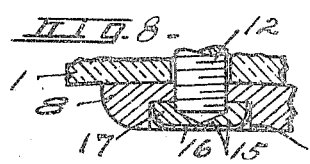
WITNESS
J. T. Mains
INVENTOR
John J. Rohrbach
BY
Hogue, Mary Campbell
ATTORNEYS Patented Mar. 15, 1938

2,111,333

UNITED STATES PATENT OFFICE 2,111,333

LOCK MEANS FOR COUPLING ELEMENTS IN OPHTHALMIC MOUNTINGS OR THE LIKE

John J. Rohrbach, Rochester, N. Y., assignor to Shuron Optical Company, Inc., Geneva, N. Y., a corporation of New York Application November 1, 1934, Serial No. 750,925

10 Claims. (Cl. 88—47)

This invention relates to means for locking coupling elements, such as screws, studs or the like, used for clamping or pivoting two or more members together, in the desired operative position.

The invention pertains more particularly to a locking means peculiarly adapted to be used in connection with ophthalmic mountings for eye glasses, spectacles and the like wherein the lenses and temple bars are secured to a frame or suitable strap mountings by screws or studs.

When the coupling screws or studs are secured in the usual manner by screw threads or press fit to maintain the lens frame or mounting straps in position, these coupling elements often become loosened to the extent that the lenses are liable either to drop from the frames or in case of rimless eye glasses to sag and thus become out of alignment with each other. The loosening of the lens screws is particularly prevalent when an auxiliary spring shoe is employed in connection with strap mountings for rimless spectacles.

When employing this latter structure, it will be understood that the coupling screw for securing the strap mounting to the lens cannot be tightened to such an extent as to cause the ears of the strap to tightly grip the sides of the lens as is the case when the conventional rimless strap mounting is used for the reason that the spring or resilient auxiliary shoe would be thereby prevented from functioning.

In other words, when a mounting strap comprising a spring shoe is used, it is necessary to adjust the tension of the lens coupling screw much more delicately than when used in the usual rimless strap mounting so as to permit relative pivotal movement of the lens and strap mounting about the lens screw as an axis for the spring to be effective. It, therefore, is obvious that the lens screw is not tightened sufficiently to cause it to be securely locked in position by friction and is consequently liable to become loosened.

The primary object of this invention is to produce simple and efficacious means for securely locking elongated, relatively small coupling elements such as fine screws, studs or the like employed in delicately constructed mechanism, such as various scientific and industrial instruments, jewelry, ophthalmic mountings, etc., in the operative position.

A more specific object of the invention is to provide a locking means for the coupling screws of spectacle structures that may be utilized with the conventional rim or strap mounting structure without alterations or changes thereof of any kind so that it is optional whether or not the locking device is used or omitted.

Another object of the invention resides in providing a locking means for the coupling elements of structures of the class mentioned above that may be applied after said elements have been adjusted to obtain the required or desired tension between the associated parts.

The conventional manner of assembling spectacle structures comprises providing coupling screws or the like having a length somewhat greater than required and after the screws are adjusted to provide the proper tension between the associated members, the ends of the screws are cut off substantially flush with the adjacent member coupled thereby. It will thus be readily understood that inasmuch as the clamping or pivoting screws in many instances are plated with gold or other suitable material, when the ends of the screws are thus cut off, the base metal of the screw is exposed at said end.

A further object of the invention is to provide a locking means for coupling screws of lens mountings comprising a cover or cap member provided with a readily fusible substance such as solder at the inner sides thereof and having the outer surface thereof coated with gold or other suitable material and which is adapted to conceal the end of the screw and the fusible metal therebeneath when applied to the screw.

Other objects and advantages pertaining to the details of the device and to the manner of applying the same will more fully appear from the following description taken in connection with the accompanying drawing in which:

Figure 1 is a perspective view of a pair of spectacles having my novel locking means associated with the coupling screws therefor.

Figure 2 is a perspective view of a single lens with an adjacent portion of a spectacle frame and temple bar associated therewith, and incorporating my invention.

Figure 3 is a fragmentary perspective view of one side of a rimless lens having a conventionally constructed mounting strap in which the lens clamping screw is provided with a modified form of my novel locking device.

Figure 4 is an enlarged detail sectional view taken substantially on the line 4—4, Figure 1.

Figure 5 is an enlarged detail sectional view taken substantially on line 5—5, Figure 2.

Figure 6 is an enlarged detail sectional view taken substantially on line 6—6, Figure 3.

Figure 7 is a detail sectional view similar to Figure 6, illustrating a modified form of a mounting strap clamping structure together with my locking means associated therewith.

Figure 8 is a fragmentary sectional view illustrating the outer end of a clamping member and the adjacent portion of a lens mounting member showing a still further arrangement of my novel locking means.

In Figure 1 of the drawing, I have illustrated a pair of rimless spectacles comprising lenses 1, temple bars 2, and a nose or bridge piece 3 and mounting straps 4 which operatively connect the temple bars 2 and bridge 3 to the lenses. In the structure shown in Figure 1, the mounting straps 4 are of special design in that they each comprise a spring member or auxiliary shoe 6 which is mounted in the inner face of the rigid shoe 7 and extends outwardly beyond the ends of the rigid shoe for engagement with the adjacent edge portion of the lens.

The mounting strap 4, as illustrated in Figures 1 and 4 comprises the usual pair of ears 8 which are connected at one end with the saddle or end portion 9 of the strap and have the other ends thereof provided with aligned holes 10 and 11 for the reception of a clamping screw 12. One of the ear holes as 11 is provided with screw threads adapted to receive the threaded end of the screw 12 for effecting the clamping relation of the screw with the ears and lens 1 in the usual manner.

In assembling the mounting strap 4 with the lens, the screw hole as 13 in the lens is drilled a shorter distance from the adjacent edge of the lens than the distance from the inner face of the rigid shoe 7 to the screw holes 10 and 11 in the ears 8 so that said rigid shoe will be normally spaced from the adjacent edge of the lens. As before stated, the auxiliary shoe 6 is mounted adjacent the rigid shoe 7 at the inner face thereof and has the outer ends curved inwardly for engagement with the adjacent edge of the lens.

In mountings of this class, the clamping screw 12 is adjusted to maintain the strap ears 8 in close proximity to the adjacent face of the lens so as to permit relative pivotal movement of the lens and strap about the screw as an axis and the tension of the spring 6 is relied upon to yieldingly maintain the lens in predetermined relation with the strap.

It will thus be understood that the clamping screw 12 is not screw-threaded into the aperture 11 to such an extent as to bring the ears 8 into tight gripping relation with the adjacent faces of the lens 1 and, therefore, the screw 12 will not be brought into sufficient frictional engagement with the ears 8 to lock said screw in the operative position. It will also be seen that due to the fact that the screw 12 is not drawn tightly enough to securely lock the same in position, the screw will, during relative pivotal movement of the lens and strap, frequently become loosened with the result that it must again be tightened by screw-threading the screw into the aperture 11. As the tightening of the screw is often accomplished by a novice, the screw frequently becomes so tightly adjusted as to bring the ears into such gripping contact with the lens as to render the auxiliary shoe 6 ineffective and as often occurs the glass becomes cracked or broken.

In order to overcome this difficulty, I have provided a simple and inexpensive locking means 15 for maintaining the clamping screw 12 in the operative position. This locking means, as shown in Figure 4, comprises a cup-shaped imperforate case 16 composed preferably of brass or other material having a high melting point and which is gold plated or gold filled to correspond in appearance to the surface of the adjacent strap member as in this instance the ears 8.

The case 16 is of somewhat larger cross sectional area than the end of the screw 12 to which it is applied. The case 16 is filled to a greater or less degree with soft solder 17 or other similar material which is of easy fusibility.

The clamping screws as 12 for eye glasses or spectacle mountings are, as usually provided, of greater length than required and after they have been adjusted to the operative position the threaded ends of the screws are cut off adjacent the corresponding surface of the mounting member.

In conventional practice, the screw is permitted to remain in this unfinished state or under certain circumstances the screw may be finished with a screw-finishing machine which is merely a revolving spindle with a cupped point that spins over the end of the screw to give it a rounded shape.

It will, therefore, be readily understood that when the clamping screws are mounted in this manner and when the gold plated screws are used the base metal at the end of the screw is exposed and that the only means acting to prevent the loosening of the screw is the frictional engagement of the screw with the adjacent portion of the mounting.

When using my novel locking means 15, the end of the screw is first moistened with a suitable liquid flux and then this member is placed over the end of the screw with the fusible material adjacent the screw which has been severed after which the fusible metal 17 contained in the case 16 is subjected to sufficient heat to melt the fusible metal by any suitable means as by passing an electric current through the screw by the aid of an electric soldering machine, not shown, in a manner well-known to those skilled in the art. As the fusible metal 17 is thus melted, it not only fuses or welds the case 16 to the end of the screw and to the adjacent portion of the lens mounting but the molten metal also, as has been shown by experiment, actually flows around the threads between the screw and the adjacent mounting member and thereby securely locks the screw to the mounting member.

It will thus be seen that the screw is not only secured in its operative position but that the end of the screw is completely concealed beneath the case 16, leaving only a gold or plated surface exposed.

It is preferable, as shown in Figure 4, that a groove as 18 be provided in the face of the lens mounting adjacent the severed end of the clamping screw 12 for the reception of the peripheral edge of the case 16 which may, as shown, be extended beyond the fusible material 17 so that when the locking member is secured to the screw the edge of the case will be seated in the groove and thereby provide a substantially smooth even surface from the mounting member to the case 16 so that when the locking member is in position, the assembly will present an artistic finished appearance.

It will be understood that inasmuch as the drawing of Figure 4 is greatly magnified, the distance from the surface of the ear 8, as shown in Figure 4, to the end surface of the case 16 is greatly exaggerated.

In Figures 2 and 5 I have illustrated my novel locking means 15 as being applied to the clamping screws 12 of the frame ends as 20 of the lens frame 21 and also to the pivotal screw 12' for the temple bar 2. In the structure shown in these two figures, the screws 12 and 12' are mounted in the conventional manner as above described for the screw 12 in Figure 4, and the locking member is constructed and applied to said screws in the same manner as described above in connection with the locking means for the screw in Figure 4. While the clamping screw 12 in Figures 2 and 5 is usually adjusted when in the operative position to tightly clamp the frame ends 20 to each other, it is a well-known fact that even such screws often become loosened and require readjusting and, therefore, it is desirable that the locking means as 15 be applied to the screws to not only secure the screws in the operative position but to also cover the exposed ends and particularly the exposed base material at the end of the screw.

In Figures 3 and 6 I have shown a modified form of my novel locking means as 15'. In the structure shown in these views and more particularly in Figure 6, my clamping means is adapted to be utilized with clamping screws as 25 for lens mounting which do not have the ends thereof severed but are permitted to extend beyond the adjacent face of the lens mounting member.

In the structure shown in Figure 6, the locking member 15' is constructed substantially the same as the locking member 15 with the exception that the case as 16' is perforated to provide a central aperture 26 adapted to receive the end of the screw 25 therethrough. Similarly the fusible metal 17 is provided with an aperture therethrough for the screw 25.

In the application of the locking member 15', after the clamping screw 25 has been brought to the operative position, the outer end portion of the screw and the adjacent face of the mounting member as the ear 8 is moistened with liquid flux and then the locking member is placed over the end of the screw with the edge of the case in contact with the mounting member after which the fusible material 17 is melted by the application of electric current or other suitable means for fusing the case, screw and mounting member together.

Although I have illustrated the clamping member in Figures 6 and 7 as extending outwardly beyond the locking member or adjacent portion of the mounting, it is obvious that these ends may, if desired, be cut off adjacent the outer surface of the corresponding member and then be finished by spinning over the end of the screw with a suitable finishing apparatus in the manner well-known by those skilled in the art.

In Figure 7, I have illustrated my modified form of locking member 15' associated with a modified form of clamping means which, in this instance, comprises a shouldered stud 29. In this instance, the stud 29 is frictionally received in the ear members 8 and has the forward end thereof projected a short distance beyond the outer face of the ear. The locking member 15' is constructed and applied in the same manner as described for the member 15' shown in Figure 6.

In Figure 8 I have illustrated a still further slightly modified manner of applying my novel locking means to a clamping screw. In this instance, the outer face of the mounting member as the ear 8 is provided with a recess 34 adjacent the forward end of the clamping screw 12 adapted to receive the locking member as 15 therein. In this instance, the recess is of sufficient depth to completely contain the case 16 of the locking member so that the outer face thereof is positioned substantially flush with the outer face of the mounting member 8 to which the locking member is applied.

While I have illustrated my novel locking means as being applied to an ophthalmic mounting, it is obvious, as before stated, that it may be as readily utilized in connection with other devices, such as jewelry, cameras, time pieces, etc., for securing the coupling elements in the operative position, and although the construction, application and operation of my locking device are particularly simple, practical and efficient, it is evident that various changes may be made in the detailed construction without departing from the spirit of the invention as set forth in the appended claims.

I claim:

1. The combination with an ophthalmic mounting having a lens strap provided with spaced ears for receiving a lens therebetween and a lens screw passing through aligned holes in one of said ears and said lens and being screw-threaded into an aligned hole in the other one of said ears, said screw being of a length such that its threaded end is substantially flush with the outer surface of its cooperating ear, of a locking and finishing device for said screw comprising a relatively thin cup-shaped case mounted over said threaded end of the screw in non-holding relation therewith and in contact with the adjacent ear, and fusible means wholly within the case for securing the case and screw to each other and to said ear.

2. The combination with an ophthalmic mounting having a lens strap provided with spaced ears for receiving a lens therebetween and a lens screw passing through aligned holes in one of said ears and said lens and being screw-threaded into an aligned hole in the other one of said ears, said screw being of a length such that its threaded end is substantially flush with the outer surface of its cooperating ear, of a locking and finishing device for said screw comprising a relatively thin cup-shaped imperforate case of greater cross-sectional area than that of the threaded end of the screw positioned over said screw and in non-holding relation therewith to conceal said screw end, and fusible means wholly within the case for fixedly securing the case and screw to each other and to the adjacent ear member.

3. The combination with an ophthalmic mounting having a lens strap provided with spaced ears for receiving a lens therebetween and a lens screw passing through aligned holes in one of said ears and said lens and being screw-threaded in an aligned hole in the other one of said ears, said screw being of a length such that its threaded end extends slightly beyond the outer surface of its cooperating ear, of a locking and finishing device for said screw comprising a perforate sheet metal cup-shaped case of greater cross sectional area than the threaded end of the screw for receiving said screw end therethrough in non-holding relation therewith and to extend axially of the screw into contact with the adjacent ear, and fusible means wholly within the case for fixedly securing the case and screw to each other and to the adjacent ear.

4. In an ophthalmic mounting comprising, in combination, a lens strap having spaced ears for receiving a lens between them and a lens screw passing through aligned holes in one of said ears and in said lens and being screw threaded in an aligned hole in the other one of said ears, said latter ear being provided with a recess surrounding the adjacent end of the screw, an imperforate cup-shaped relatively thin case of substantially the same cross sectional area as said recess mounted in said recess in non-holding engagement with the screw to extend across the end of the screw for concealing the same, and fusible means within the case for securing the case and screw to each other and to the adjacent ear.

5. In an ophthalmic mounting comprising, in combination, a lens strap having spaced ears for receiving a lens between them and a lens screw passing through aligned holes in one of said ears and in said lens and being screw-threaded in an aligned hole in the other one of said ears, said latter ear being provided with an annular recess in the outer surface thereof arranged substantially concentric with the screw and spaced therefrom, a relatively thin cup-shaped case of greater cross sectional area than the threaded end of the screw mounted over said screw and in non-holding relation therewith and with the edge thereof seated in said annular recess, and fusible means within the case for fixedly securing the case and screw to each other and to the adjacent ear.

6. An ophthalmic mounting comprising two members to be joined, an elongated coupling element extending through aligned holes provided in said members, said coupling element having a head at one end engaging one of said members, a cap of greater cross sectional area than that of said coupling element positioned adjacent the other end of said coupling element and in non-holding relation therewith, and fusible means within said cap fixedly securing said cap and said coupling element to each other and to the adjacent member.

7. An ophthalmic mounting comprising, in combination, a member having spaced ears for receiving a lens or mounting element between them, an elongated coupling element passing through aligned holes provided in said ears, said coupling element having a head at one end engaging the adjacent ear, and means for concealing the opposite end of said coupling element and for fixedly securing the same to the ear adjacent thereto comprising an imperforate cup-shaped relatively thin case of greater cross sectional area than said latter end of the coupling element positioned over said end of said element in non-holding relation therewith, and fusible holding means wholly within the case member having operative engagement with the case, coupling element and said ear.

8. An ophthalmic mounting as in claim 7 in which the last mentioned ear member is provided with a recess in the outer surface thereof surrounding the adjacent end of the coupling element, and wherein said case is mounted in said recess.

9. An ophthalmic mounting comprising, in combination, a lens strap having spaced ears receiving a lens between them, means permanently securing the lens strap to the lens comprising an elongated coupling element extending through aligned holes provided in said lens and ears, said coupling element having a head at one end engaging the adjacent ear of the lens strap and screw-threads at the opposite end thereof, an imperforate cup-shaped relatively thin case of greater cross sectional area than that of the screw-threaded end of the coupling element positioned over said latter end of said coupling element in non-holding relation therewith to conceal the same, and fusible means within the case fixedly securing said case and coupling element to each other and to the adjacent ear member.

10. An ophthalmic mounting as in claim 9 wherein the last mentioned ear member is provided with a recess in the outer surface thereof of substantially the same cross sectional area as the case surrounding the adjacent end of the coupling element, and wherein said case is mounted in said recess.

JOHN J. ROHRBACH.